United States Patent [19]
Okuaki et al.

[11] Patent Number: 5,557,762
[45] Date of Patent: Sep. 17, 1996

[54] DIGITAL SIGNAL PROCESSOR EVALUATION CHIP AND DEBUG METHOD

[75] Inventors: Yasuyuki Okuaki; Kazushige Yamamoto, both of Tokyo, Japan

[73] Assignee: Oki Electric Industry Co., Ltd., Japan

[21] Appl. No.: 297,684

[22] Filed: Aug. 29, 1994

Related U.S. Application Data

[63] Continuation of Ser. No. 829,921, Feb. 3, 1992, abandoned.

[30] Foreign Application Priority Data

Feb. 13, 1991 [JP] Japan .................................. 3-020004

[51] Int. Cl.⁶ .................................................. G06F 11/25
[52] U.S. Cl. .................. 395/375; 395/183.1; 364/232.8; 364/265.6; 364/267.91
[58] Field of Search .................................. 395/550, 575, 395/375

[56] References Cited

U.S. PATENT DOCUMENTS 4,275,441  6/1981  Takeuchi .................................. 395/575
4,290,133  9/1981  Stewart et al. ........................... 395/550
4,670,838  6/1987  Kawata .................................... 395/550

*Primary Examiner*—Kevin J. Teska
*Assistant Examiner*—Ayni Mohamed
*Attorney, Agent, or Firm*—Edward D. Manzo; Mark J. Murphy

[57] ABSTRACT

A digital signal processor evaluation chip has a sequencer for fetching and decoding instructions, and a processor core for executing the instructions. When the sequencer attempts to fetch an instruction from a preset break address, a register transfer instruction is supplied in place of the program instruction at that address, then clock input to the sequencer is halted. After the processor core has executed the register transfer instruction, clock input to the processor means is also halted, leaving the data transferred by the register transfer instruction available to be read.

16 Claims, 2 Drawing Sheets

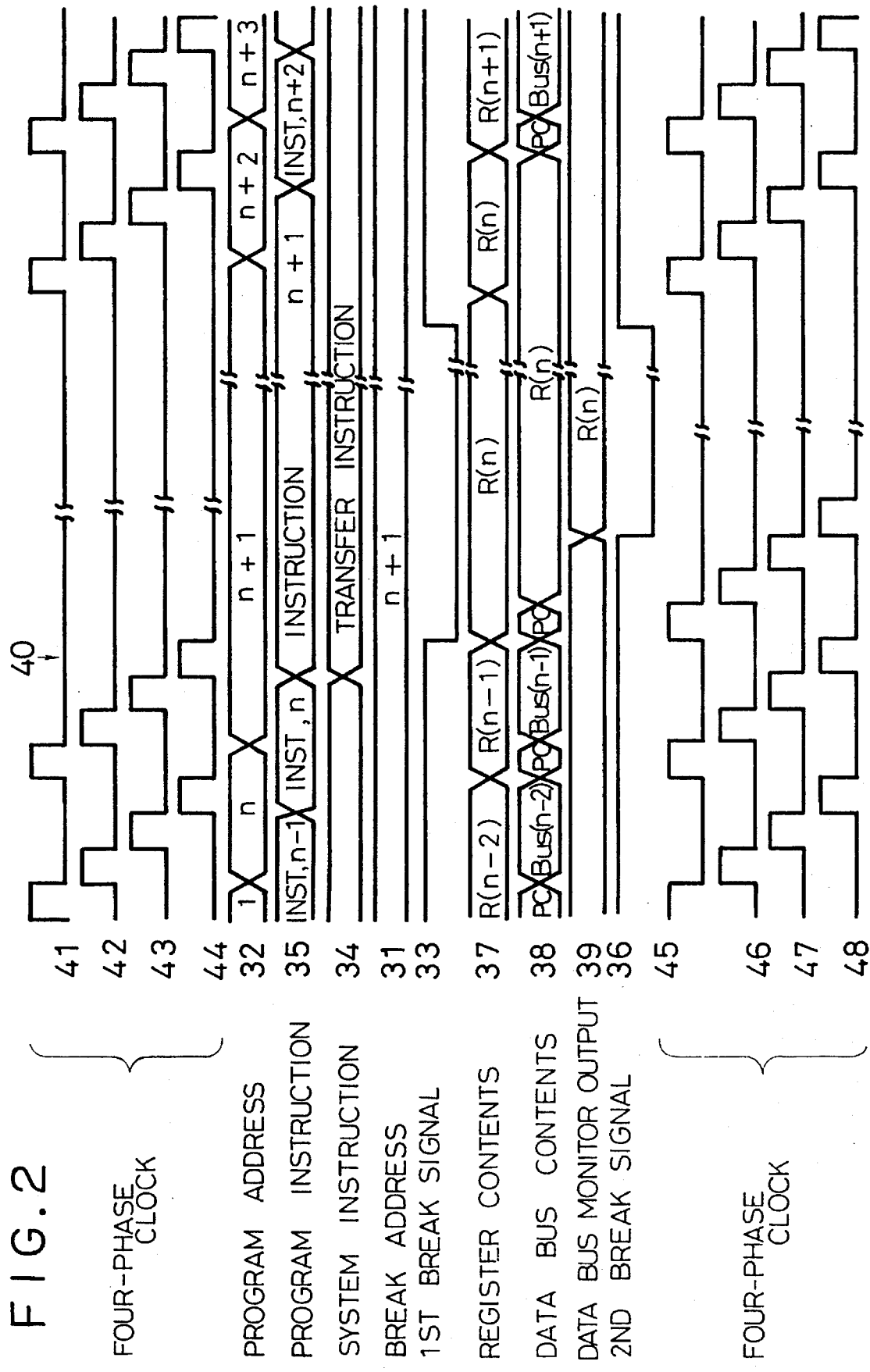

5,557,762

DIGITAL SIGNAL PROCESSOR EVALUATION CHIP AND DEBUG METHOD

This is a continuation of application Ser. No. 07/829,921 filed on Feb. 3, 1992 now abandoned.

BACKGROUND OF THE INVENTION

This invention relates to a digital signal processor evaluation chip (integrated circuit) and a debug method using this evaluation chip.

Digital signal processors (DSPs) are widely used in communication and image-processing equipment, to name only two of many applications. To assist in the debugging of DSP applications, manufacturers provide DSP evaluation chips adapted so that the user can halt program execution at an arbitrary address and examine the contents of internal DSP registers.

Prior-art evaluation chips comprise, for example, a clock control circuit For halting the DSP clock in response to a break signal, a step-execution control circuit for executing instructions one at a time during the break state, and a data bus monitor circuit for transferring data from an on-chip data bus to external emulator apparatus. To halt program execution and see register contents, the debugger sends the clock control circuit a break signal, then sends the step-execution control circuit a register data transfer instruction. This instruction causes register contents to be placed on the data bus, from which they can be read via the data bus monitor circuit.

The complexity of step-execution control circuits and clock control circuits, however, makes these prior-art evaluation chips difficult and costly to manufacture. In many cases the step execution function is-not needed. It would suffice to halt program execution at a selected address and view register contents, but the prior art provides no means of accomplishing tills in DSP chips without a step-execution control circuit.

SUMMARY OF THE INVENTION

It is accordingly an object of the present invention to enable register contents to be viewed in a DSP evaluation chip without a step-execution Function.

The invention employs a DSP evaluation chip comprising sequencer means for generating program addresses and Fetching and decoding instructions, and processor means for executing the instructions. The sequencer means and processor means are driven by separate clock signals. When an external circuit detects agreement between a program address output by the sequencer means and a preset address, first a register transfer Instruction is input to the sequencer means in place of the next program instruction, then clock input to the sequencer means is halted. After the register transfer instruction has been executed by the processor means, clock input to the processor means is also halted, and the data transferred by the register transfer instruction are read.

BRIEF DESCRIPTION OF THE DRAWINGS

FIG. 2 is a timing chart illustrating a preferred embodiment of the invented debug method.

DETAILED DESCRIPTION OF THE INVENTION

Figure 1:
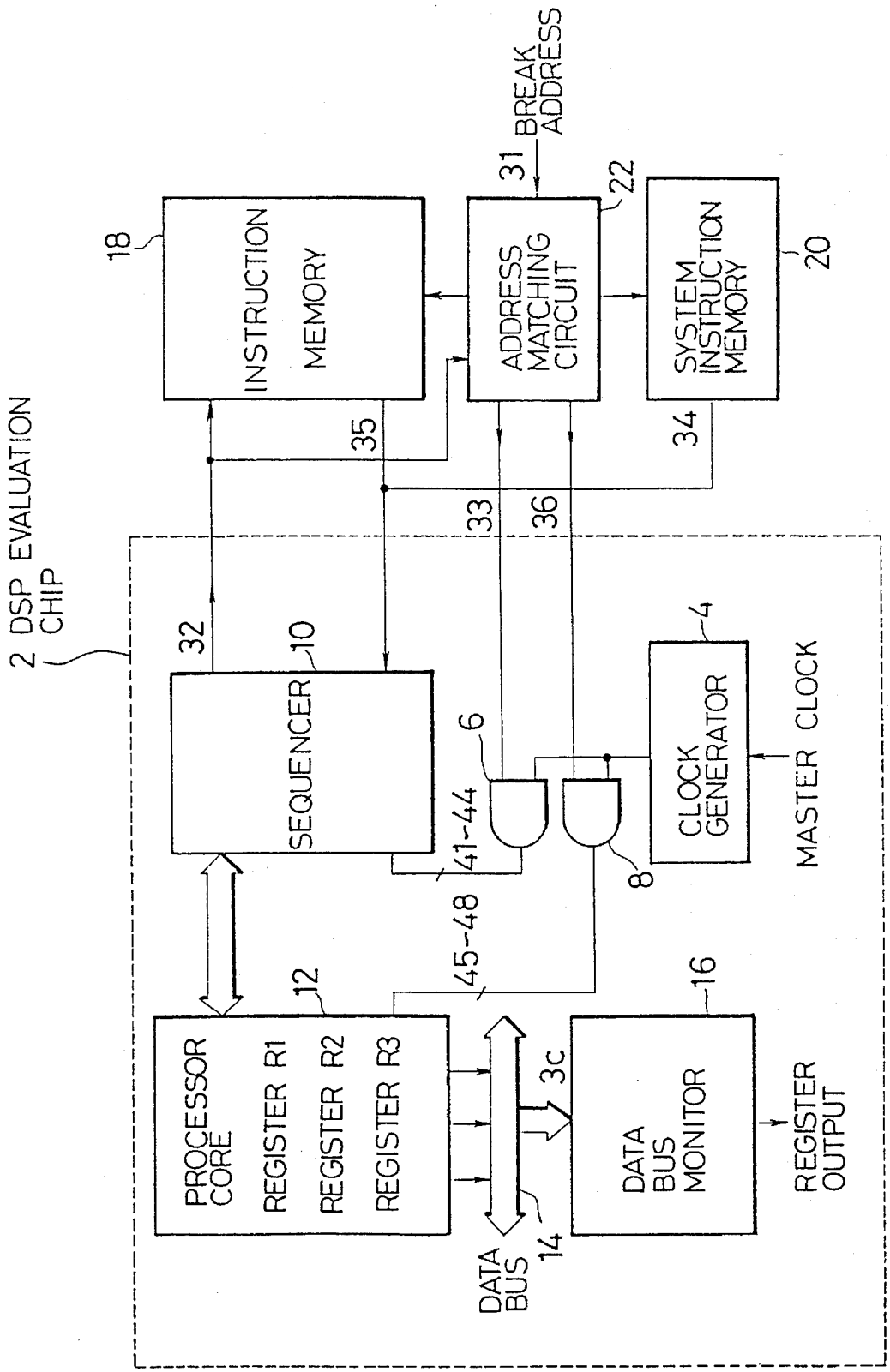
FIG. 1 is a block diagram of a preferred embodiment of the invented digital signal processor evaluation chip.

The invented DSP evaluation chip and debug method will be described with reference to the drawings. The drawings are illustrative in nature and do not restrict the scope of the invention, which should be determined solely from the appended claims.

Referring to FIG. 1, a novel DSP evaluation chip 2 comprises a clock generator 4 that generates a four-phase clock signal, which it provides as Input to a first AND gate 6 and a second AND gate 8. The output of the first AND gate 6 drives a sequencer 10 that generates program addresses, fetches program instructions, and decodes the instructions. The output of the second AND gate 8 drives a processor core 12 that executes the instructions fetched and decoded by the sequencer 10.

The invention is not limited to the use of AND gales 6 and 8. Other gating means such as OR gates can be used, depending on signal polarity.

The instructions executed include arithmetic instructions that perform an arithmetic operation on the contents of two registers such as registers R1 and R2 in FIG. 1 and place the result in a third register such as register R3, and transfer instructions that transfer the contents of a register such as register R1 to another register or to external memory. When a data transfer instruction is executed, the register contents are placed on a data bus 14. A data bus monitor circuit 16 enables an external emulator system to read the data on the data bus 14.

The external emulator system comprises an instruction memory 18 that stores the instructions fetched by the sequencer 10, a system instruction memory 20 that stores other instructions for use in debugging, and an address matching circuit 22 that (a) compares program addresses generated by the sequencer 10 with a preset break address, (b) sends a first break signal as input to the first AND gate 6, and (c) sends a second break signal as input to the second AND gate 8.

The invented debug method will be described with reference to FIG. 2, which also explains the operation of the DSP evaluation chip 2 in FIG. 1.

Referring to FIGS. 1 and 2, at the beginning of a debug run the operator enters a break address 31 to the address matching circuit 22. If the operator wants to stop program execution after the instruction at address n and examine the contents of a certain target register, for example, he enters the subsequent address n+1, and stores in the system instruction memory 20 a transfer instruction that transfers data from the target register to the data bus 14. Then the operator starts program execution.

As the DSP evaluation chip 2 executes the program, the sequencer 10 generates successive program addresses 32 and sends them to the instruction memory 18. As long as these addresses do not match the break address 31, the first break signal 33 and second break signal 36 remain high, and no instruction 34 is output from the system instruction memory 20. The instruction memory 18 outputs program instructions 35 from successive program addresses 32, the sequencer 10 decodes these instructions, and the processor core 12 executes the instructions. As a result, register contents 37 in the processor core 12 change. In FIG. 2, R(k) indicates the register contents resulting from execution of instruction k (the instruction at address k; k=n−1, n, n+1, . . . ).

During this process the data bus contents 38 also change. In general the data bus 14 alternates between carrying a program counter (PC) value and register input or output data, indicated In FIG. 2 as Bus(n–2), Bus(n–1), etc.

At a time shown by reference numeral 40 in FIG. 2, the address matching circuit 22 will eventually detect a match between the address 32 output by the sequencer 10 and the preset break address 31. The address matching circuit 22 thereupon sends signals to the instruction memory 18 and the system instruction memory 20 that disable output from the instruction memory 18 and enable output from the system instruction memory 20. As a result, the sequencer 10 receives and decodes the target register transfer instruction stored in the system instruction memory 20.

Next the address matching circuit 22 drives the first break signal 33 low, causing the first AND gate 6 in FIG. 1 to stop supplying the four-phase clock signal to the sequencer 10. The clock input to the sequencer 10 is indicated by the signal waveforms 41, 42, 43, and 44 at the top of FIG. 2. During the interval while the first break signal 33 is low and the clock input 41, . . . 44 is stopped, the sequencer 10 continues to output the value n+1 as the program address 32.

The processor core 12, which is still receiving clock signals 45 to 48 from the second AND gate 8, executes the target register transfer instruction and places the contents of the target register on the data bus 14. Since the transfer instruction does not alter register contents, the data on the data bus 14 are the register contents R(n) following execution of the previous program instruction n.

After this transfer instruction has been executed, the address matching circuit 22 drives the second break signal 36 low, halting clock input 45, . . . , 48 to the processor core 12. No further instructions are executed, and the target register value R(n) remains on the data bus 14. The data bus monitor circuit 16 provides tills value R(n) as output 39 to the emulator system.

After viewing the target register data R(n), or storing the data in the system instruction memory 20, the operator can resume program execution by entering a command that causes the address matching circuit 22 to drive the first break signal 33 and the second break signal 36 high again, while enabling output from the instruction memory 18 and disabling output from the system instruction memory 20. Execution resumes from the point at which it halted: the sequencer 10 fetches the instruction at address n+1 in the instruction memory 18, and the processor core 12 executes this instruction.

The novel DSP evaluation chip thus breaks program execution and affords a view of register data without requiring complex circuitry for step execution or clock control. The only extra circuits required in this embodiment are a pair of AND gates G and 8 and the data bus monitor circuit 16. The novel DSP evaluation chip can thus be manufactured easily and supplied to users at a comparatively low cost.

It will be apparent to those skilled in the art that uses of the novel DSP evaluation chip are not limited to the debug method described above, but include other methods as well. For example: the contents of two or more registers crux be viewed by having the processor core 12 execute two or more transfer instructions; the program address can be altered by supplying a branch instruction instead of a transfer instruction from the system instruction memory 20; and program instructions can be skipped by allowing the sequencer 10 to run while halting the processor core 12. Thus a fairly extensive set of debug functions can be implemented in a simple and economical manner.

What is claimed is:

1. A digital signal processor evaluation chip comprising:

a clock generating circuit for generating a multi-phase clock signal;

a first gating circuit coupled to said clock generating circuit, for gating said multi-phase clock signal with a first break signal, thus outputting a first clock signal when said first break signal is in one state in a first period and halting the first clock signal when said first break signal is in another state in a second period after said first period and in a third period after said second period;

a second gating circuit coupled to said clock generating circuit, for gating said multi-phase clock signal with a second break signal, thus outputting a second clock signal when said second break signal is in one state in said first and second periods and halting said second clock signal when said second break signal is in another state in said third period;

a controlling circuit, coupled to said first gating circuit and driven by said first clock signal, for fetching and decoding instructions when said first clock signal is output;

a processing circuit, coupled to said second gating circuit and said controlling circuit, driven by said second clock signal, and having at least one register for performing arithmetic operations and a transfer operation on data in said register responsive to said instructions when said second clock signal is output; and a data bus, coupled to said processing circuit, for receiving data from said register when said transfer operation is performed.

2. The chip of claim 1, wherein said first gating circuit and said second gating circuit and said second gating circuit comprise AND gates.

3. The chip of claim 1, wherein said multi-phase clock signal has four phases.

4. A debug method for a digital signal processor evaluation chip having a controlling circuit for outputting program addresses and fetching and decoding instructions and a processing circuit for executing the instructions, comprising the steps of:

(a) providing clock input to said controlling circuit and said processing circuit during a first period;

supplying instructions to said controlling circuit from a program memory in response to said program addresses during said first period;

(c) detecting agreement between a program address output by said controlling circuit and a preset address;

(d) providing a register transfer instruction to said controlling circuit in place of an instruction from said program memory, then proceeding from said first period to a second period;

(e) halting clock input to said controlling circuit in said second period, thereby preventing said controlling circuit from fetching and decoding further instructions;

(f) waiting until said register transfer instruction has been executed, proceeding from said second period to a third period, and halting clock input to said processing circuit in said third period, thereby preventing said processing circuit from executing further instructions; and (g) reading data transferred by said register transfer instruction.

5. The method of claim 4, wherein said controlling circuit and said processing circuit are both provided with input of a four-phase clock signal in said providing clock input step (a).

6. The method of claim 5, wherein said halting clock input step (e) is performed by gating said four phase clock signal with a first break signal.

7. The method of claim 6, wherein said step (f) is performed by gating said four-phase clock signal with a second break signal.

8. The method of claim 4, wherein said four-phase clock signal is generated on said digital signal processor evaluation chip.

9. The method of claim 7, wherein said four-phase clock signal is gated with said first break signal and said second break signal on said digital signal processor evaluation chip.

10. The method of claim 4, wherein said data are read from a data bus on said digital signal processor evaluation chip.

11. A debug method for a digital signal processor evaluation chip of the type having a controller for generating program addresses and fetching instructions and a processor for executing instructions and outputting data, comprising the steps of:

providing a program memory storing instructions to be executed by said processor;

generating a first clock signal and a second clock signal;

supplying said first clock signal to said controller during a first period, and independently supplying said second clock signal to said processor during said first period, thereby causing said controller to output program addresses to said program memory, said controller to fetch the instructions stored at said program addresses in said program memory, and said processor to execute the instructions fetched by said controller;

detecting output of a predetermined program address from said controller, and terminating said first period when said output of said predetermined program address is detected;

continuing to supply one clock signal among said first clock signal and said second clock signal while ceasing to supply another clock signal among said first clock signal and said second clock signal, during a second period following said first period; .

ceasing to supply both said first clock signal and said second clock signal during a third period following said second period; and reading the data output by said processor during said third period.

12. The method of claim 11 wherein said step of supplying comprises coupling said first clock signal to said controller through a first gating circuit, and coupling said second clock signal to said processor through a second gating circuit;

and wherein said step of continuing comprises altering a condition of one gating circuit among said first gating circuit and said second gating circuit.

13. The method of claim 11 wherein said step of continuing comprises continuing to supply said second clock signal to said processor and ceasing to supply said first clock signal to said controller.

14. A digital signal processor chip comprising:

a clock node for receiving a first clock signal;

a first gating circuit coupled to said clock node, for gating the first clock signal with a first break signal, and for outputting a second clock signal responsive to said first break signal, said second clock signal being outputted when said first break signal is in one state in a first period, and halted when said first break signal is in another state in a second period after the first period;

a second gating circuit coupled to said clock node, for gating the first clock signal with a second break signal, and for outputting a third clock signal responsive to said second break signal, said third clock signal being outputted when said second break signal is in one state in said first and said second periods and halted when said second break signal is in another state in a third period after said second period;

a data bus for transferring data;

a controller for receiving the second clock signal and fetching and decoding instructions while said second clock signal is received; and a processor with at least one register coupled to said data bus, for receiving the third clock signal, receiving instructions decoded by the controller, and processing data in response to said instructions while said third clock signal is received.

15. The chip of claim 14, wherein one of the instructions fetched and decoded by said controller is an instruction for transferring data from said register to said data bus.

16. The chip of claim 14, further comprising a data bus monitor coupled to said data bus, for receiving data on said data bus and providing said data as an output of the digital signal processor chip.

* * * * *